United States Patent [19]

Flowers et al.

[11] 4,254,231
[45] Mar. 3, 1981

[54] HIGH SOLIDS WIRE COATING COMPOSITIONS FOR TRANSFORMERS

[75] Inventors: Ralph G. Flowers, Pittsfield; Thomas L. Sherer, Richmond; Robert P. Anderson, Dalton, all of Mass.

[73] Assignee: General Electric Company, N.Y.

[21] Appl. No.: 75,076

[22] Filed: Sep. 13, 1979

[51] Int. Cl.³ ............... C08L 63/00; C08L 29/04
[52] U.S. Cl. ............... 525/58; 260/33.4 EP
[58] Field of Search ............... 525/58

[56] References Cited

U.S. PATENT DOCUMENTS

| | | | |
|---|---|---|---|
| 2,856,094 | 10/1958 | Gloyer | 525/58 |
| 3,239,598 | 3/1966 | Olson | 525/58 |
| 3,442,834 | 5/1969 | Flowers | 525/58 |
| 3,471,589 | 10/1969 | Rinehart | 525/58 |

FOREIGN PATENT DOCUMENTS

| | | | |
|---|---|---|---|
| 1065118 | 9/1959 | Fed. Rep. of Germany | 525/58 |
| 38-2716 | 2/1963 | Japan | 525/58 |
| 4655043 | 3/1973 | Japan | 525/58 |
| 49-41627 | 11/1974 | Japan | 525/58 |
| 1083684 | 9/1967 | United Kingdom | 525/58 |

Primary Examiner—Paul Lieberman
Attorney, Agent, or Firm—Richard A. Menelly; Francis X. Doyle

[57] ABSTRACT

The addition of a polyisocyanate to high solids wire coating compositions of the type consisting of a mixture of polyvinylacetal, phenol-aldehyde and epoxy resin systems improves the properties of the coated wire over a wide range of operating conditions.

5 Claims, 3 Drawing Figures

HIGH SOLIDS WIRE COATING COMPOSITIONS FOR TRANSFORMERS

BACKGROUND OF THE INVENTION

Transformer wire coating compositions containing a three component resin system consisting of polyvinylacetal, phenol-aldehyde and epoxy resins are disclosed in U.S. patent applications Ser. No. 889,889; now U.S. Pat. Nos. 4,215,174 970,249; allowed and 075,077 now U.S. Pat. No. 4,254,231 (Flowers et al). The use of the epoxy resin in the wire coating composition allows solids contents of from 28 to 30% to be applied at room temperature and 36% solids to be applied at about 55° C. The epoxy, when in the low molecular weight liquid form, improves the rheological properties of the coating during application. Viscosities between 1,000 and 10,000 centipoise are attained both at room temperature and at 55° C. The liquid epoxy is also necessary in the 100% solid powder forms of these compositions in order to have the coating coalesce and flow out uniformly. The improved flow-out properties of the three component compositions allows the solvent quantity to be greatly reduced and even eliminated in the case of the powder resulting in both ecological and economical benefits.

The presence of the epoxy resins in the insulating coating compositions compromises some of the physical properties of the coating to the extent that optimum properties can be obtained only within narrow operating conditions.

U.S. Pat. No. 3,239,598 also discloses an insulated wire coating which may include an epoxy resin. Reissue Pat. No. 25,625 discloses a structural adhesive composition which may also contain an epoxy resin. Both of these patents, however, are concerned with combinations of the components in resin systems which are outside that area disclosed within this application for resin systems as usable as wire coatings.

U.S. Pat. No. 3,412,354 discloses the use of a solution of a polyisocyanate or blocked polyisocyanate used as a dipping solution for transformer coils wound with adhesive overcoated wires which result in a rigid structure when heat treated. The instant invention distinguishes over the teachings of this patent by the addition of blocked polyisocyanates to a three component wire coating composition within an operable range of isocyanate groups in the composition.

The purpose of this invention, therefore, is to disclose methods and materials for increasing the range of operating conditions at which the three component wire coating compositions can be applied for the production of usable wire insulating coatings.

SUMMARY OF THE INVENTION

Wire coating compositions containing 20 to 60% polyvinylacetal, 14 to 43% phenol-aldehyde and 10 to 60% epoxy resin with a catalyst selected from the group consisting of a metal octoate, glycynate and acetylacetonate are modified by the addition of a polyisocyanate or blocked polyisocyanate.

GENERAL DESCRIPTION OF THE INVENTION

As disclosed within the aforementioned U.S. Patent Applications, incorporated herein for purposes of reference, wide ranges of epoxy, polyvinylacetal and phenolic resins can be employed as wire coating compositions provided that the ratio of the polyvinylacetal to phenolic is within the range of 1.1 to 2.0. Coatings from compositions above the 2.0 ratio have high dissipation factors which are undesirable for electrical insulation and the coatings from compositions below the 1.1 ratio have poor flexibility due to the increased phenolic content. The higher epoxy compositions are preferred since the epoxy beneficially contributes both to the lowering of the solution viscosities and to the flow out properties of the coating composition when applied to transformer wire.

The optimum properties, such as snap elongation, cut-through temperature and flexibility of the epoxy containing compositions are currently attainable within a narrow operating window. The range of speeds at which satisfactory wire coatings can be produced in a given wire tower at a given temperature profile is defined as the "operating window" for the material being applied. In order to improve the snap elongation, cut-through temperature and flexibility of the coatings from the three component compositions, so that useful coatings could be obtained over a wider operating window, some of the hydroxyl groups of the epoxy chain were crosslinked by means of a polyisocyanate. The polyisocyanates are used in the form of blocked polyisocyanates in order to react with the epoxide hydroxyl groups only after becoming heated in the curing oven within the wire coating tower. One method for blocking the isocyanates consists of heating the polyisocyanates with cresols or alkanols to form intermediate compounds, which are stable at room temperature, but dissociate at the curing temperature of the wire coatings to regenerate active isocyanate groups. The activated isocyanate groups then react with available epoxide hydroxyl groups to cross-link the groups as described earlier.

DESCRIPTION OF THE PREFERRED EMBODIMENTS

Figure 1:
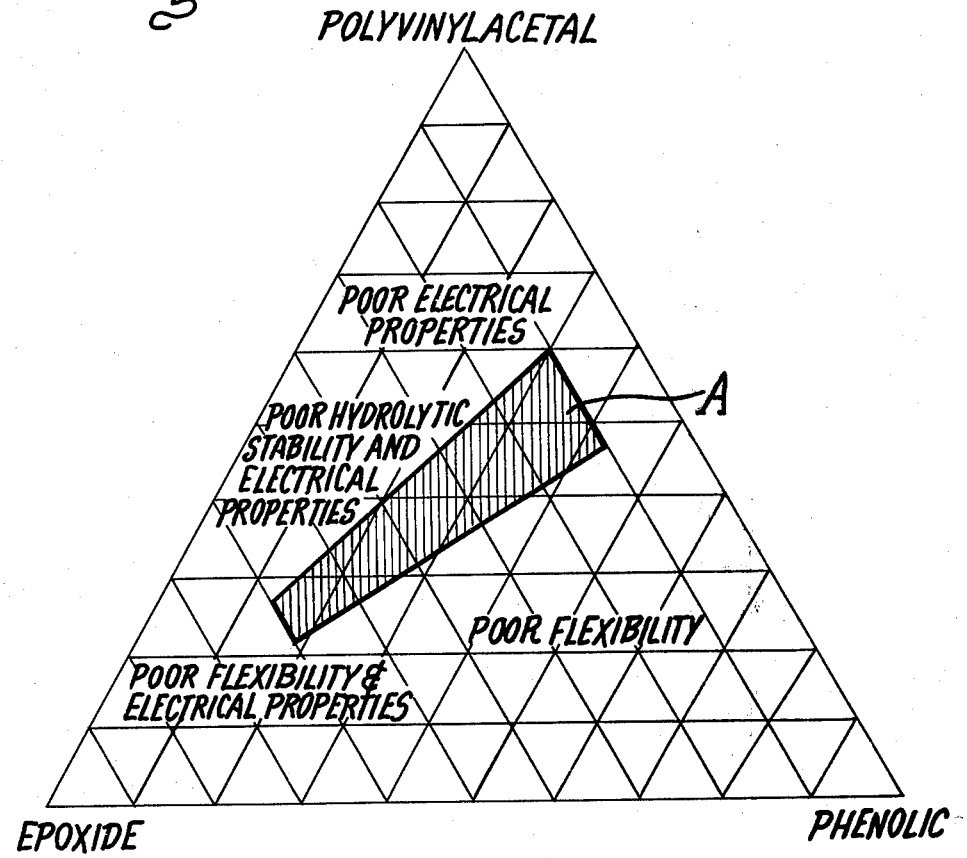
FIG. 1 is a triaxial diagram of the operative ranges of the three component resins used within the composition of the instant invention.

FIG. 1 shows a triaxial diagram indicating the useful ranges of polyvinylacetal, phenolic and epoxide resins for wire coating compositions. The regions outside the area designated A result in coated wires having poor electrical properties, poor hydrolytic stability and poor flexibility as shown. As disclosed in the aforementioned U.S. Patent Applications the ratio of the polyvinylacetal resin to phenolic must be within the range of 1.1 to 2.0 in order to include a range in which the epoxy resin which is operational from 10 to 60%.

The following wire coating samples were formulated using a wire coating composition from within operative region A of FIG. 1 and the range of coating speeds were evaluated for each sample tested in order to determine the effect of polyisocyanate additions on the wire coating process. For purposes of this disclosure, an acceptable wire coating is defined as a wire coating which passes qualifying physical, electrical and thermal tests.

EXAMPLE 1

DER: 332 (diglycidyl ether of bisphenol A) was added to a mixture consisting of polyvinylacetal and phenolic resin to give a three component formulation containing 34% epoxy, 38% polyvinylacetal and 28% phenolic resin. The resins were dissolved in a hydrocarbon cresol solvent to which zinc octoate catalyst was added in an amount of 2% by weight of the epoxy. The viscosity of the 36% solids coating solution measured 21,000 cp (centipoise) at room temperature and 2800 cp at 55° C.

This 36% solids coating composition was successfully applied at 55° C. It is to be noted that all the compositions contained within region A, in FIG. 1, will produce wire coatings that are suitable for use as an insulation for transformers. In order to evaluate the operating "window" for examples listed within this invention three qualifying tests were selected to determine whether the wire coated with the sample coating could be wound into a transformer coil winding. The three tests selected for determining whether the wire coating would be useful in transformer winding operations are the "snap-elongation", "cut-through temperature" and flexibility tests. The snap-elongation tests consisted of the sudden elongation of a measured length of the coated wire out to a prescribed incremental (15–25%) increase in length followed by a visual observation of the coating to determine the presence of any cracks. The presence of a single crack in the coating structure was considered a failure. In order to determine the cut-through temperature, a length of the coated wire was cut into two lengths and one length was laid perpendicular across the other. A weight was applied to the top wire and both wires were slowly heated until the coating softened and flowed under the applied pressure causing the bare wires to touch. The higher the cut-through temperature therefore, the more suited the coated wire for winding into a transformer coil. A cut-through temperature lower than 180° C. was considered a failure. A flexibility of three times the wire diameter after 25% stretch was required.

EXAMPLE 2

Example 2 was prepared in the same manner as the composition in Example 1 except that 4.2% of a blocked polyisocyanate based on the total resin weight was added to the coating solution.

EXAMPLE 3

Example 3 was similar in composition to Example 1 with 1.8% aluminum acetylacetonate based on the epoxy resin weight substituted for the zinc octoate catalyst.

EXAMPLE 4

Example 4 was similar to the enamel composition in Example 3 with addition of 4.2% of a blocked polyisocyanate based on the total resin weight.

Figure 2:
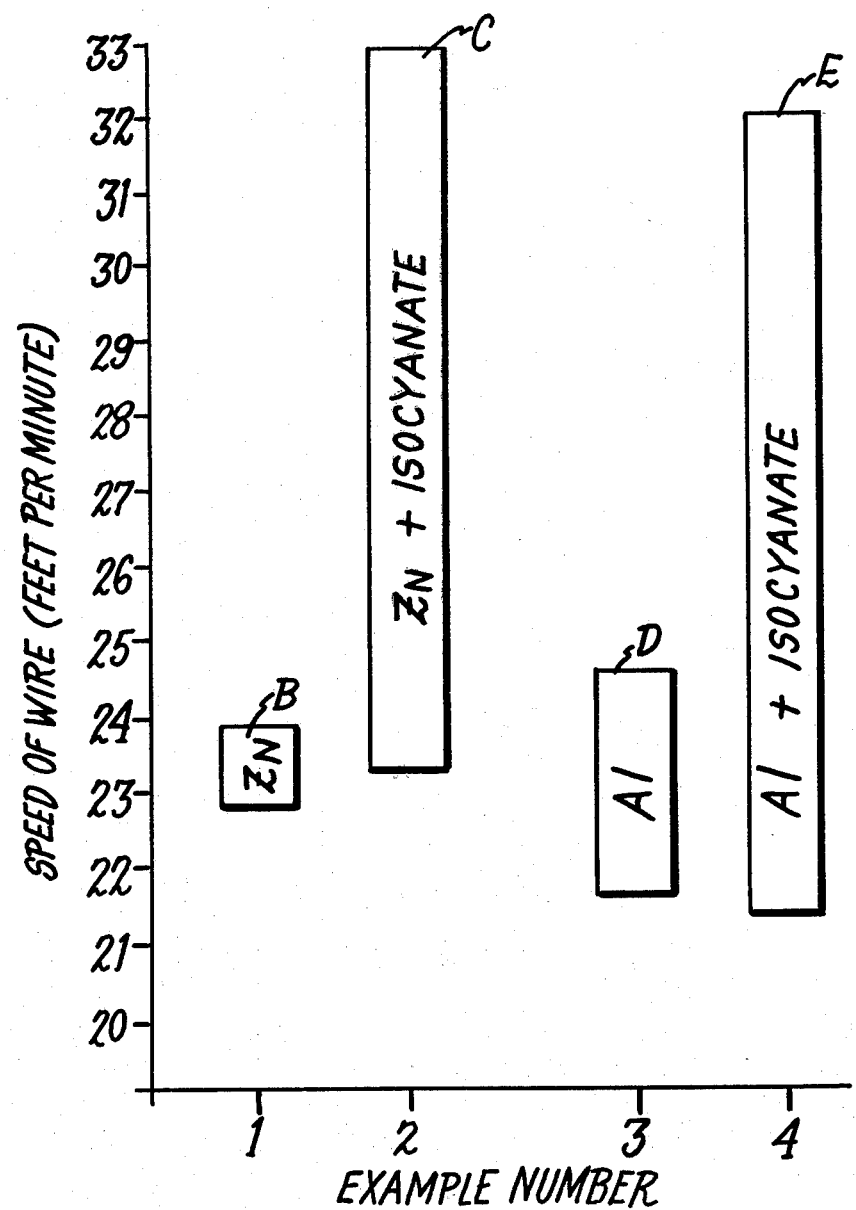
FIG. 2 is a graphic representation of the wire coating speed for a plurality of samples containing the three component resins shown in FIG. 1.

The speed at which the wires were coated during the coating operation was continuously increased until the wire samples failed one or more of the aforementioned tests. The results of these tests are shown in FIG. 2 wherein the wire speed in feet per minute is depicted as a bar graph for each of the four samples tested. Example 1 shown at B, passed the qualifying tests within a range of from 23 to 24 feet per minute. Example 2 shown at C, passed the tests within a wire coating speed of from 23.5 to 33 feet per minute. Example 3 shown at D, passed the tests within a wire coating speed range from 21.5 to 24.5 feet per minute. Example 4 shown at E, passed the tests with a wire coating speed of from 21.5 to 32 feet per minute. Since the previous examples consisted of wire enamel compositions, that is, resins applied from a coating solution, the following example was prepared to determine whether coatings could also be applied from a dry powder in an electrostatic coating process not containing any solvents.

EXAMPLE 5

A mixture of 10.5 parts polyvinylacetal, 7.0 parts phenol-aldehyde resin and 7.5 parts of epoxy resins with 7.2% of a blocked polyisocyanate and 4% zinc octoate catalyst based on the epoxy resin weight was made up as a powder and applied electrostatically to transformer wire. This powder coalesced into a smooth film and was cured as it passed through the ovens giving a coating with excellent physical and electrical properties. The wire coatings prepared from this composition exhibited an operating window which was equivalent to that of Example 8.

The polyisocyanates employed within Examples 2 and 4 were of the type having the general formula $R—(N=C=O)_n$ wherein R is a polyvalent organic radical and n is an integer of 2 or more. The isocyanate group defined by the radical $(N=C=O)$ will hereinafter be referred to simply as NCO. The polyisocyanates of the type defined by the general formula

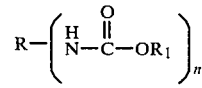

wherein R is a polyvalent organic radical, n is an integer of three or more and $R_1$ is a phenol group, as one example. The polyisocyanates were in the form of blocked polyisocyanates in order to react with the epoxide hydroxyl group only after the epoxide groups had been exposed to the heat supplied in the wire tower oven. The polyisocyanates employed in the aforementioned examples were blocked by heating with cresols or alkanols to form intermediate isocyanate compounds which are stable at room temperature, but dissociate at the higherd temperatures needed for curing the wire coating in order to generate the active isocyanate groups, NCO, which then react with the available expoxide hydroxyl groups as described earlier.

In order to show the effect of the addition of the blocked polyisocyanates to coating compositions on the size of the operating window, a rating index was determined based upon the range in wire coating speed, in feet per minute, at which the coated wire passed the aforementioned qualifying tests. A plurality of Examples, 6–10, similar to the wire coating composition of Example 1, were formulated with increasing amounts of blocked isocyanates and the corresponding wire coating speed ranges were measured in order to determine the operating window rating index. The following table lists the Examples containing the increasing block polyisocyanate additions.

TABLE I

| Example | % Blocked Polyisocyanate | % NCO | Rating Index |
| --- | --- | --- | --- |
| 6 | 1.1 | .11 | 0 |
| 7 | 5.2 | .52 | 4.6 |
| 8 | 10.4 | 1.04 | 7.7 |
| 9 | 15.6 | 1.56 | 10.1 |
| 10 | 20.8 | 2.08 | 4.7 |

Figure 3:
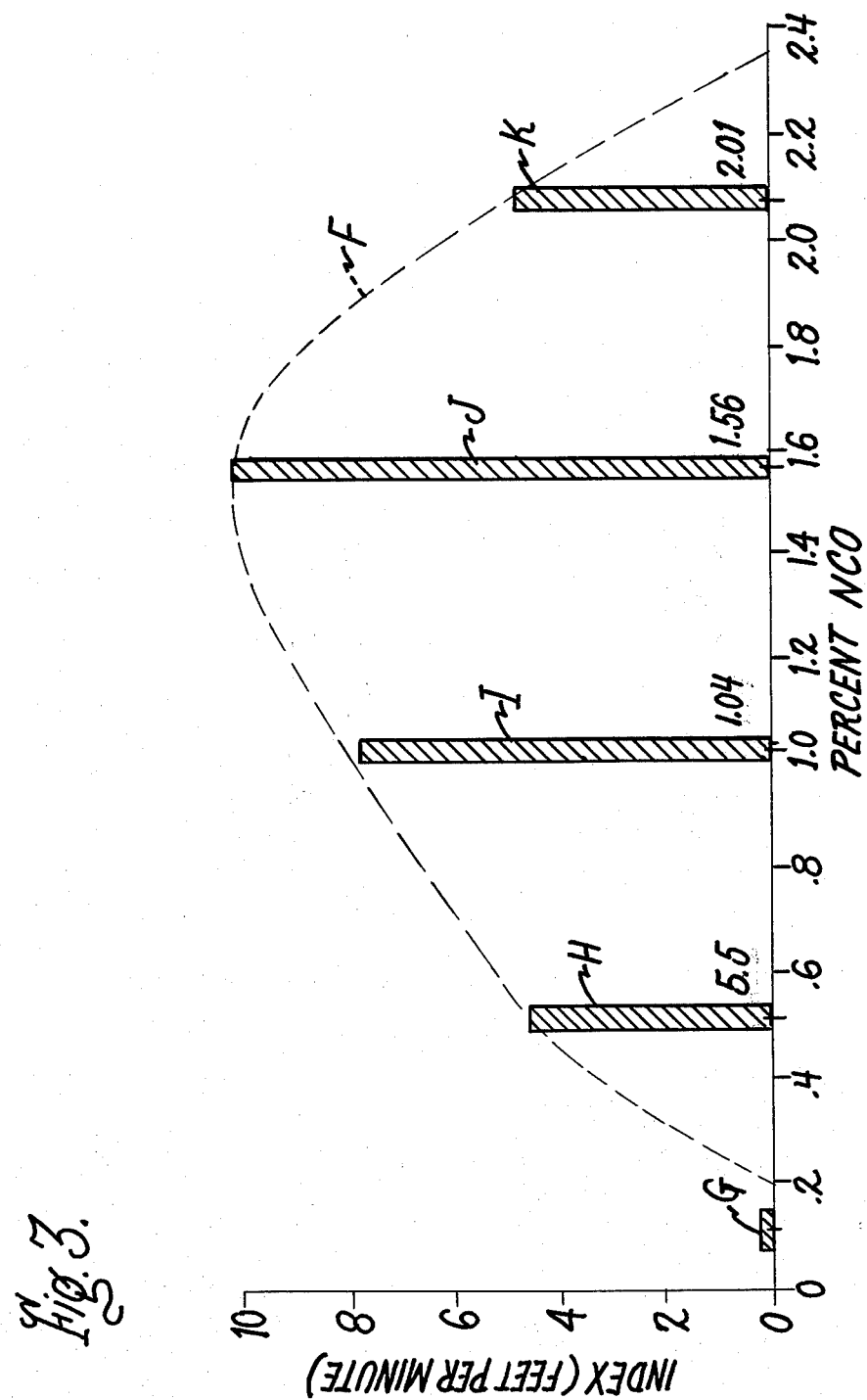
FIG. 3 is a graphic representation of the operating index for the wire coating composition according to the invention.

An envelope F statistically defining the rating index in feet per minute is shown correspondingly at (G-K) in FIG. 3 for each of the examples listed in Table 1. Since the blocked polyisocyanates can be obtained in a variety of compositions, the operating index is plotted against the percent isocyanate radical NCO, rather than as a function of the percent blocked polyisocyanates. FIG. 3 shows therefore, that the operating index can range from 0.2 to 2.4% NCO with an operating maximum in the vicinity of approximately 1.50%.

Although the wire coating composition of the invention is described for use as a transformer wire insulating coating, this is by way of example only. The electrically insulated wire coating of the invention finds application wherever insulating wires may be employed.

What we claim as new and desire to secure by Letters Patent of the United States is:

1. An improved wire coating composition consisting of a mixture of epoxy, polyvinylacetal and phenolic resins, wherein the improvement comprises:
   from 10 to 60% epoxy resin, 22 to 60% polyvinylacetal resin, and 14 to 43% phenolic resin;
   1 to 10% by weight of said epoxy resin of a curing agent selected from the group consisting of metal compounds and inner complex salts; and
   from 0.20 to 2.20% by weight of said compositions of isocyanate groups as blocked isocyanates.

2. The improved composition of claim 1 wherein the metal compounds comprise octoates.

3. The improved composition of claim 1 wherein the inner complex salts comprise acetylacetonates.

4. The improved composition of claim 2 wherein the octoate comprises zinc octoate.

5. The improved composition of claim 3 wherein the acetylacetonates are selected from the group consisting of zinc acetylacetonate and aluminum acetylacetonate.

* * * * *